United States Patent
Howes et al.

(10) Patent No.: US 8,832,099 B2
(45) Date of Patent: Sep. 9, 2014

(54) USER SPECIFIC FEED RECOMMENDATIONS

(75) Inventors: Timothy Howes, Los Altos, CA (US); Eric Vishria, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 178 days.

(21) Appl. No.: 12/720,394

(22) Filed: Mar. 9, 2010

(65) Prior Publication Data

US 2011/0225197 A1    Sep. 15, 2011

(51) Int. Cl.
*G06F 17/30* (2006.01)

(52) U.S. Cl.
CPC ................................ *G06F 17/30011* (2013.01)
USPC ........... 707/732; 707/736; 707/754; 707/780; 705/14.1

(58) Field of Classification Search
CPC ................... G06F 17/30867; G06F 17/30699; G06F 17/30702; G06F 21/31; G06F 17/3064; G06F 17/30011; G06Q 30/02; G06Q 30/0251; G06Q 30/0255; G06Q 30/0269; G06Q 50/01; H04L 67/26
USPC ........... 707/723, 732, 780, 999.001; 705/14.1
See application file for complete search history.

(56) References Cited

U.S. PATENT DOCUMENTS

| | | | |
|---|---|---|---|
| 7,984,056 B1* | 7/2011 | Kane ............................... | 707/749 |
| 8,010,527 B2* | 8/2011 | Denoue et al. ................. | 707/726 |
| 2007/0100836 A1* | 5/2007 | Eichstaedt et al. .............. | 707/10 |
| 2007/0214272 A1* | 9/2007 | Isaacson ........................ | 709/229 |
| 2007/0240230 A1* | 10/2007 | O'Connell et al. .............. | 726/28 |
| 2008/0010337 A1* | 1/2008 | Hayes et al. .................... | 709/202 |
| 2008/0077574 A1* | 3/2008 | Gross ................................ | 707/5 |
| 2008/0126476 A1* | 5/2008 | Nicholas et al. ............... | 709/203 |
| 2008/0140674 A1* | 6/2008 | Ishikawa .......................... | 707/10 |
| 2008/0222712 A1* | 9/2008 | O'Connell et al. ............... | 726/7 |
| 2008/0306913 A1* | 12/2008 | Newman et al. ................. | 707/3 |
| 2009/0006371 A1* | 1/2009 | Denoue et al. .................... | 707/5 |
| 2009/0037521 A1* | 2/2009 | Zilca et al. ..................... | 709/203 |

(Continued)

FOREIGN PATENT DOCUMENTS

WO    WO 2006058075 A2 *    6/2006

OTHER PUBLICATIONS

Ka Cheung Sai et al.; Monitoring RSS Feeds Based on User Browsing Pattern; http://www.icwsm.org/papers/2--Sia-Cho-Hino-Chi-Zhu-Tseng.pdf; Feb. 18, 2007.*

(Continued)

*Primary Examiner* — Dennis Truong
(74) *Attorney, Agent, or Firm* — Weaver Austin Villeneuve & Sampson LLP (57) ABSTRACT

A system for recommending feeds for a user comprises a client with a web browser, an application server, and a content server. The browser tracks the user's browsing activity and transmits user data related to the user's browsing activity to the application server. The application server searches the content server to determine feeds that may be relevant to the user's browsing activity and then communicates those feeds to the browser. The browser displays the received feeds to the user as feed recommendations, prompting the user to select from among the recommended feeds. Once the user has selected one or more feeds, the browser transmits the user's selection to the application server, which enables the feeds to be presented subsequently to the user. In this way, the system uses the user's browsing activity to obtain automatically for a user feeds that are likely to be relevant to the user.

20 Claims, 10 Drawing Sheets

(56) References Cited

U.S. PATENT DOCUMENTS

| | | | |
|---|---|---|---|
| 2009/0055267 A1* | 2/2009 | Roker | 705/14 |
| 2009/0163183 A1* | 6/2009 | O'Donoghue et al. | 455/414.1 |
| 2009/0172021 A1* | 7/2009 | Kane et al. | 707/104.1 |
| 2009/0248494 A1* | 10/2009 | Hueter et al. | 705/10 |
| 2009/0254971 A1* | 10/2009 | Herz et al. | 726/1 |
| 2010/0010987 A1* | 1/2010 | Smyth et al. | 707/5 |
| 2010/0070928 A1* | 3/2010 | Goodger et al. | 715/838 |
| 2010/0293050 A1* | 11/2010 | Maher et al. | 705/14.46 |
| 2010/0299325 A1* | 11/2010 | Tzvi et al. | 707/728 |
| 2010/0306080 A1* | 12/2010 | Trandal et al. | 705/26.8 |
| 2011/0173216 A1* | 7/2011 | Newman et al. | 707/765 |

OTHER PUBLICATIONS

Hoa Han et al.; An Automatic Web News Article Contents Extraction System Based on RSS Feeds; http://tokuda-www.cs.titech.ac.jp/~han/resume/jwe2009rss.pdf; Sep. 2, 2009.*

Jaihui Liu et al.; Personalized News Recommendation Based on Click Behavior; http://users.cis.fiu.edu/~lli003/recsys/papers/hybrid/p31-liu.pdf; Feb. 10, 2010.*

Matt MacAlister; Recommending RSS feeds on My Yahoo!; http://www.mattmcalister.com/blog/2006/08/16/88/recommending-rss-feeds-on-my-yahoo/; Aug. 16, 2006.*

PCT International Search Report and Written Opinion, PCT Application No. PCT/US11/25718, Apr. 27, 2011, 13 pages.

* cited by examiner

USER SPECIFIC FEED RECOMMENDATIONS

BACKGROUND

1. Field of Disclosure

The disclosure generally relates to the field of receiving online content, in particular to receiving online content through web feeds.

2. Description of the Related Art

A web feed is a data format used for providing periodically updated content to users who have subscribed to the feed. Typically, a content distributor publishes a web feed and provides through the web feed updated data for the subscribers to the feed. Examples of web feeds include feeds that provide news headlines on a news website, weather forecasts, stock tickers, the status information of online friends, and updates made to a user's online friends' web pages.

To receive a feed, a user typically first registers the feed with an aggregator running on the user's machine. Once a feed is registered with an aggregator, the aggregator periodically checks for any updated data available on the feed and retrieves the updated or new feed data.

Because feeds automate the process of searching for new content, feeds are a convenient mechanism to get information updates on a subject without having to search the subject every time. However, the paradigm of user specifying web feeds for subscription is itself a hurdle for subscribing to the desired feeds. One drawback is that the user may not be familiar with feed aggregators or subscribing to feeds. Another is that users often do not know what feeds are available or are unaware of feeds that may be particularly interesting or useful to them. The requirement that users must search and then register for the feeds discourages many users from subscribing to those feeds.

SUMMARY

Embodiments of the invention enable easier access to feeds by recommending feeds to a user automatically, without requiring the user to search for relevant feeds manually. In one embodiment, a user's browsing activity in a web browser is used as a proxy for the user's interests, and likely relevant or interesting feeds are inferred based on the user's browsing history.

A system for recommending such feeds for a user comprises a client with a web browser, an application server, and a content server. The browser tracks the user's browsing activity and transmits user data related to the user's browsing activity to the application server. The application server searches the content server to determine feeds that may be relevant to the user's browsing activity and then communicates those feeds to the browser. The browser displays the received feeds to the user as feed recommendations, prompting the user to select from among the recommended feeds. Once the user has selected one or more feeds, the browser transmits the user's selection to the application server, which enables the feeds to be presented subsequently to the user. In this way, the system uses the user's browsing activity to obtain automatically for a user feeds that are likely to be relevant to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables user specific feed recommendations. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
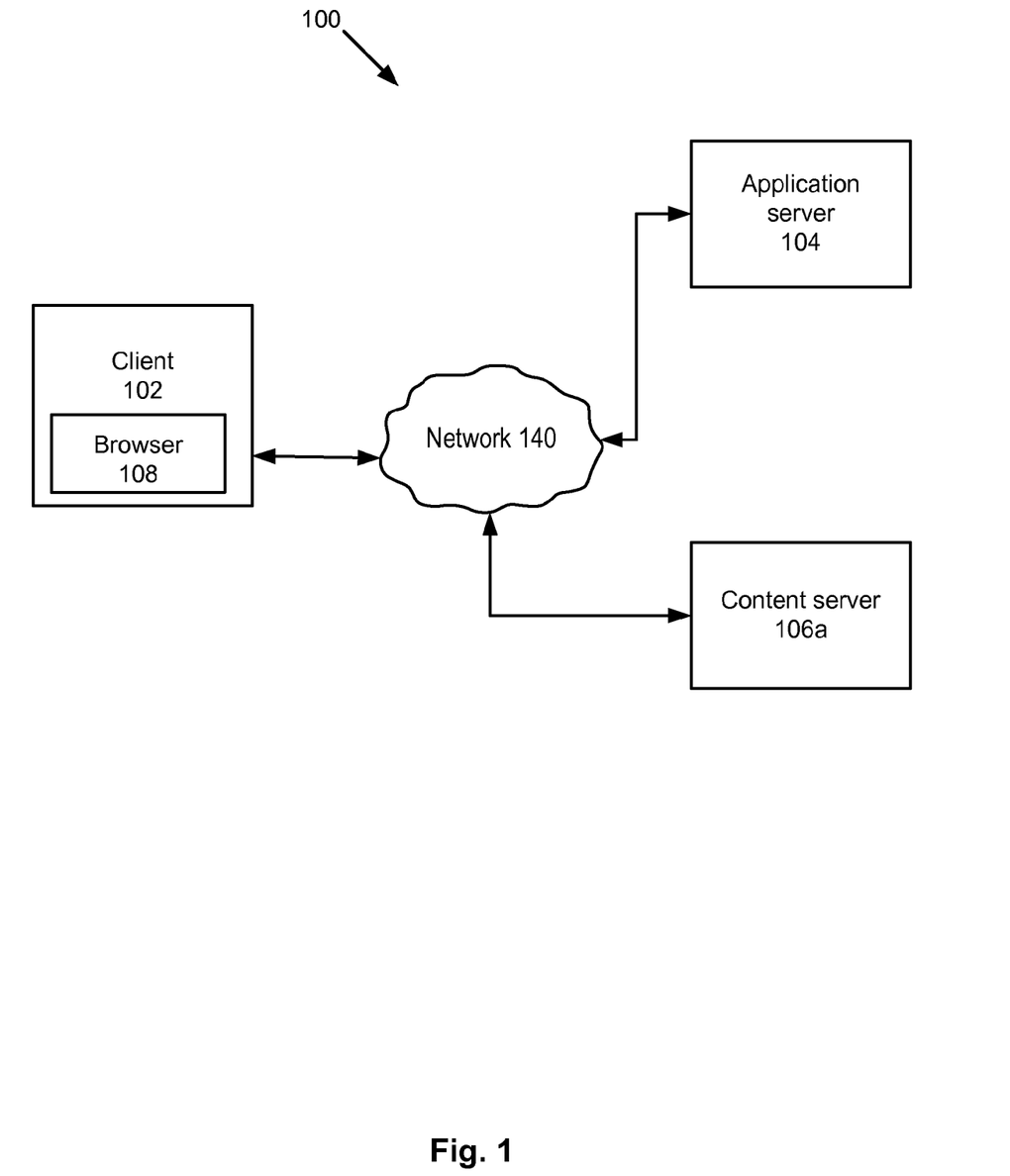
FIG. 1 is a block diagram illustrating a computing environment for recommending user specific feeds according to one embodiment.

Referring to FIG. 1, the computing environment 100 for recommending user specific feeds comprises a client 102 with a browser 108, an application server 104, a content server 106 and a network 140. The client 102 is a computing device with a processor and a memory capable of running applications like browser 108. Examples of client 102 include a desktop, a laptop and a handheld computing device.

The browser 108 is an application for retrieving, presenting, and traversing online data available on various entities like application server 104 and content server 106. Additionally, the browser 108 stores user's browsing activity and transmits the user's browsing activity to application server 104. The browser 108 also receives feed recommendations for the user from the application server 104 and displays the feed recommendations to the user.

The application server 104 is a computing system with a processor and a memory that receives and stores user data associated with the user's browsing activity. The application server 104 determines feed recommendations for the user based on the received user data and transmits the feed recommendations to browser 108 for display.

The content server 106 is a computing device with a processor and a memory that stores online content like web pages, feed content, audio or video streams etc. The content server 106 transmits the stored content over network 140 upon receiving a request for the stored content.

The Network 140 represents the communication pathways between the client 102, the application server 104 and the content server 106. In one embodiment, the network 140 is the Internet. The network 140 can also use dedicated or private communications links that are not necessarily part of the Internet.

A user launches a browser 108 on client 102 and provides authentication information to the browser 108. The browser 108 receives user input and authenticates the user. In one embodiment, the browser 108 maintains a user authentication database (not shown) and the browser verifies the user's authentication information against the authentication information saved in the user database. In another embodiment, the browser 104 transmits the user's authentication information to the application server 104, the application server 104 authenticates the user and then transmits the authentication results to the browser 108.

After the user is authenticated, the browser 108 tracks the user's activities as the user browses the web, stores user data associated with the user activity, and transmits the tracked user data to the application server 104. The application server 104 determines potential web feeds for the user based on the received user data. The application server 104 then transmits the potential feeds to the browser 108 and the browser 108 displays the potential feeds to the user. The user selects the appropriate feeds from the potential feeds and the browser 108 receives the selection from the user. The browser 108 then transmits the user's selection to the application server 104 and the application server 104 associates the selected feeds with the user and saves the user's selection. The browser 108 then starts retrieving or receiving content associated with the selected feeds from the content server 106.

The description about the browser 108 and the application server 104 assigns particular functions to one entity or another. This description and the function assignment are for illustration purposes and do not limit the server or the client to their assigned functions. Upon reading this disclosure, one of ordinary skill in the art will understand that functions described in one embodiment as being performed on the server side can also be performed on the client side in other embodiments if appropriate. Similarly, the client side functions can be performed by the server if appropriate. Additionally, the functionality attributed to a particular component can be performed by different or multiple components operating together, as deemed appropriate by the implementer.

Browser

Figure 2:
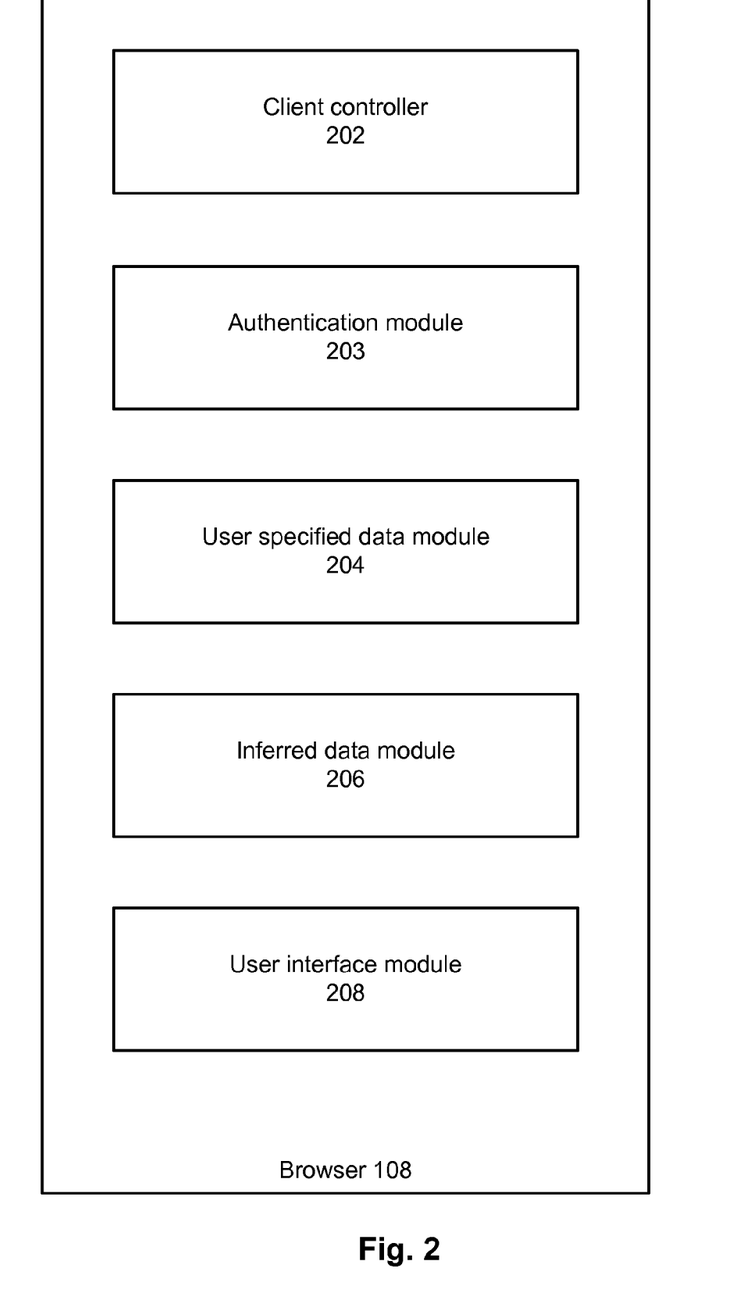
FIG. 2 is a block diagram illustrating a browser according to one embodiment.

FIG. 2 is a block diagram illustrating the browser according to one embodiment. The browser 108 comprises a client controller 202, an authentication module 203, a user specified data module 204, an inferred data module 206 and a user interface module 208.

The client controller 202 directs other modules in browser 108 to implement their respective functions at appropriate time. The client controller 202 also provides an interface between the module in browser 108 and other entities in the computing environment 100.

The authentication module 203 receives the authentication data from the user and authenticates the user. The authentication data comprises user identification and alternatively a corresponding password. The user identification and the password are alpha-numeric strings associated with the user. In one embodiment, the authentication module 203 stores authentication data for one or more users and the authentication module 203 verifies the authentication data received from the user against the stored authentication data. In another embodiment, the authentication module 203 transmits the authentication data to application server 104 or another authenticating entity (not shown) and receives a verification of the authentication data.

In one embodiment, the authentication module 203 also registers new users. In this embodiment, the authentication module 203 prompts the user for desired login and the desired password. Additionally, in one embodiment, the authentication module 203 prompts the user for information about one or more user's social networking profiles. The authentication module 203 transmits the received information to application server 104.

After the authentication module 203 authenticates the user, the user specified data module 204 and inferred data module 206 start collecting information about the user's interaction with the browser 108. Because the information is collected after the user's authentication, data modules 204-206 associate the collected information with the user's browsing pattern or browsing activity. In one embodiment, the browser 108 does not include the authentication module 203, the user is not authenticated, and the data modules 204-206 still associate the collected information with the user's browsing pattern or browsing activity. In this embodiment, the data modules 204-206 treat all users of browser 108 as one common user and associate the collected information with that common user's browsing pattern or browsing activity.

The user specified data module 204 receives and stores data that user inputs in the browser 108 or in widgets associated with the browser 108. For example, the user specified data module 204 receives the website addresses the user inputs in the address bar, the search terms the user enters in a search toolbar or a search web page, the login information the user enters in a social networking website or a social networking widget, the information the user enters in forms or shopping orders on a website, or any other information entered by the user in widgets associated with the browser 108 or pages presented by the browser 108. In one embodiment, the user specified data module 204 also stores the frequency with which the user accesses the same web page, searches the same search term, enters the same login information or enters the same information on a web page or a widget. In another embodiment, the user specified data module 204 also tracks and stores the amount of time the user spends on a particular website like a gaming website or a social networking website. The user specified data module 204 repeatedly transmits all or part of its stored information to the application server 104 and the application server 104 uses the received information to determine feed recommendations for the user.

The inferred data module 206 infers additional data associated with the user based on the user specified data. For example, the inferred data module 206 searches for and stores the embedded links in the web pages accessed by the user. In one embodiment, the inferred data module 206 stores embedded links in an accessed web page only if the embedded link's page rank, as determined by GOOGLE or another search engine, is within a threshold. In another embodiment, the web page accessed by the user is the user's homepage on a social networking site. In this embodiment, the inferred data module 206 determines the user's friends through an API provided by the social networking site. The inferred data module 206 then saves the embedded links on the friends' pages as user data. In yet another embodiment, the inferred data module 206 stores the link to the friend's page as user data. The inferred data module 206 repeatedly transmits all or part of its stored information to the application server 104 and the application server 104 uses the received information to determine feed recommendations for the user.

The user interface module 208 provides an interface between the user and the application server 104. In one embodiment, the user interface module 208 receives from the application server 104 the feed recommendations for the user, creates a web page with the feed recommendations and displays it to the user. In another embodiment, the user interface module 208 receives a web page with the feed recommendations and the user interface module 208 displays the web page to the user. In yet another embodiment, the user interface module 208 first displays a message on the browser 108 informing the user that feed recommendations are available. Regardless of how recommended feeds are communicated to the user, the user selects one or more recommended feeds and the user interface module 208 receives and transmits the user's selection to application server 104. In an alternate embodiment, the client controller 202 receives the recommended feed from the application server 104 and adds the recommended feed to a list of feeds associated with the user and/or the browser 108. The client controller 202 then directs the user interface module 208 and the user interface module 208 displays a message to the user that notifies the user of the added feed. Additionally, in one embodiment, the user interface module 208 also provides an option for the user to delete the added feed. The user interface module 208 then receives the user's decision regarding deleting the feed and the user interface module 208 transmits the received selection to the application server 104.

Application Server

Figure 3:
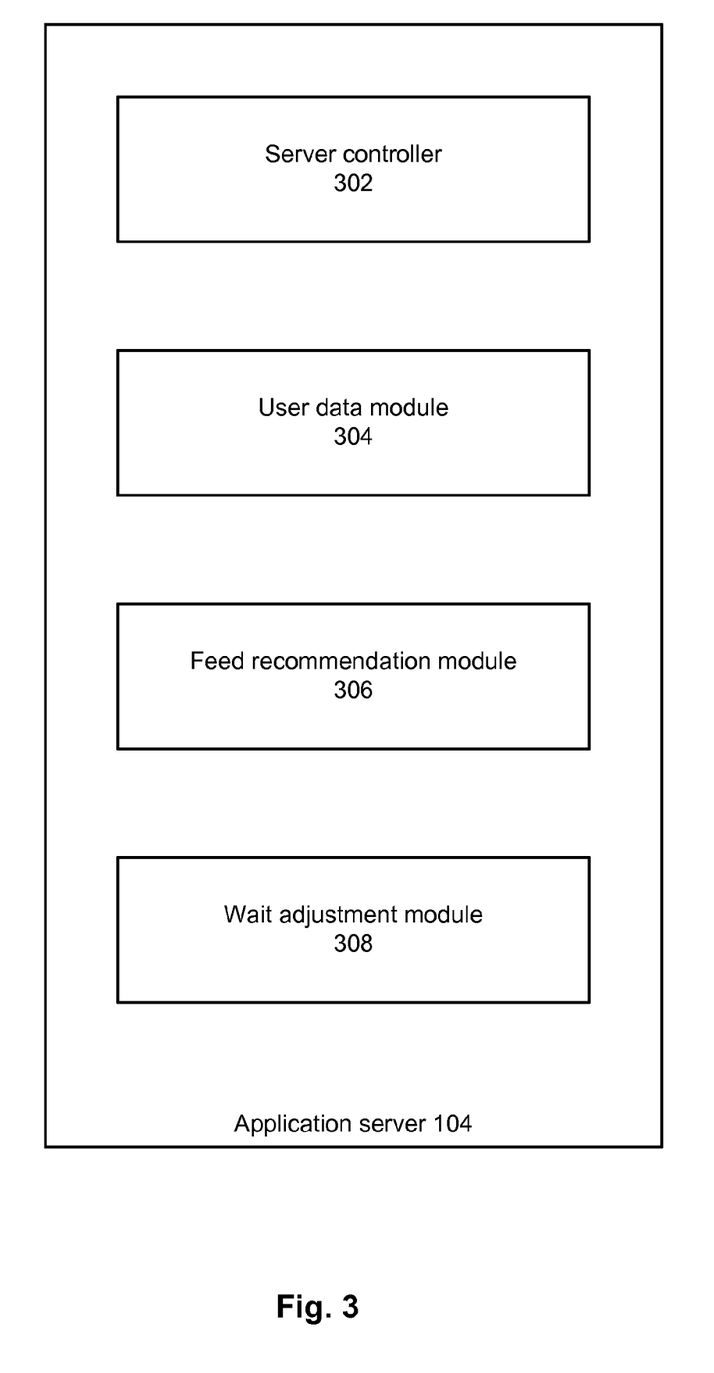
FIG. 3 is a block diagram illustrating an application server according to one embodiment.

FIG. 3 is a block diagram illustrating the application server according to one embodiment. The application server 104 comprises a server controller 302, a user data module 304, a feed recommendation module 306 and a wait adjustment module 308.

The server controller 302 directs other modules in application server 104 to implement their respective functions at appropriate time.

The user data module 304 stores user data associated with users of browser 108. The user data module 304 repeatedly receives user data from the user specified data module 204 and the inferred data module 206. Accordingly, the user data module 304 stores for a user the data directly specified by the user and the data inferred by the browser 108 about the user. Additionally, in one embodiment, the user data module 304 also stores the authentication information for various users. Accordingly, the user data module 304 stores a user login and optionally a password for the user.

Figure 4:
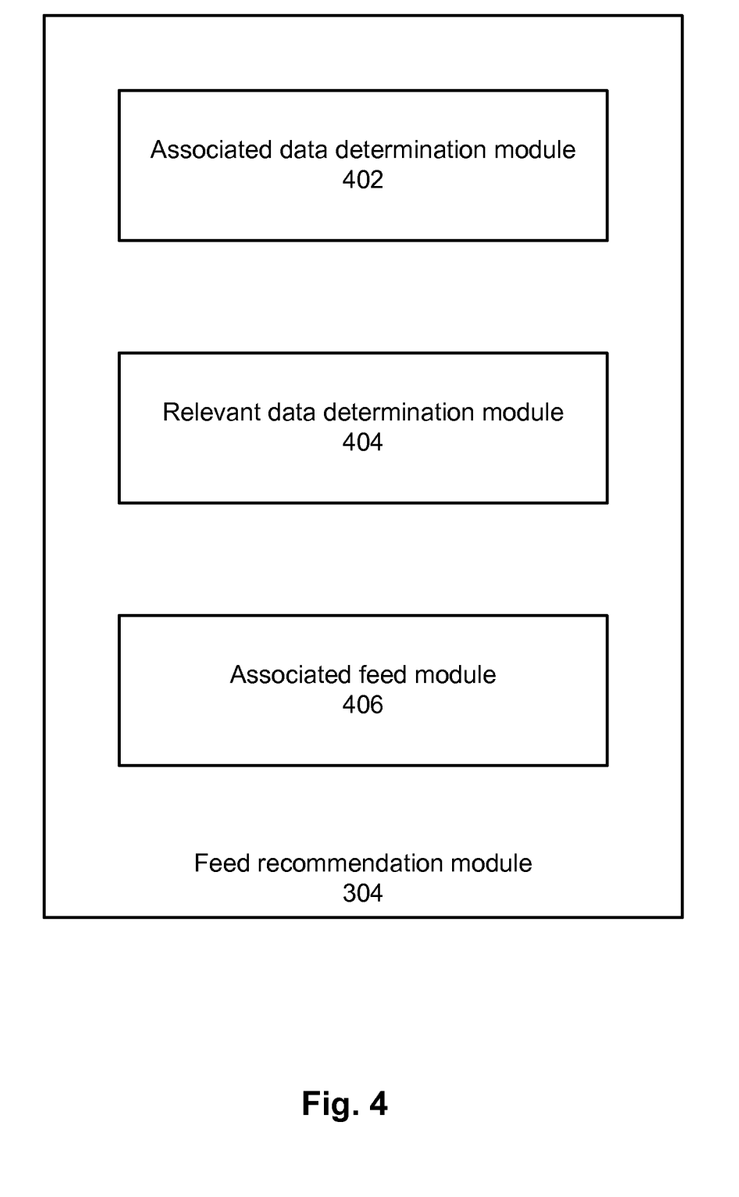
FIG. 4 is a block diagram illustrating a feed recommendation module according to one embodiment.

The feed recommendation module 306 analyzes the user data in user data module 308 and determines feed recommendations for the user based on its user data analysis. Referring to FIG. 4, the feed recommendation module 304 comprises an associated data determination module 402, a relevant data determination module 406 and an associated feed module 406.

The associated data determination module 402 receives the user's authentication information from the authentication module 203 and retrieves from the user data module 304 the user data associated with the received authentication information. The associated data determination module 402 then determines the data associated with the retrieved user data. For example, for user data comprising web addresses, the associated data comprises the content of the web page referenced by those web addresses. Additionally, for user data comprising search terms, the associated data comprises the web pages that are a result of a search using those search terms. The associated data determination module 402 therefore accesses web pages that are referenced by the web addresses in user data or web pages that are a result of searches based on search terms in user data. The associated data determination module 402 then retrieves the associated content from the accessed web pages and transmits the retrieved associated data to relevant data determination module 404.

The relevant data determination module 404 receives the associated data and determines the relevant data from the received associated data. In one embodiment, the relevant data determination module 404 selects all the received associated data as relevant data. In another embodiment, the relevant data determination module 404 trims the associated data and the trimmed associated data is used to recommend feeds. In some embodiments, the relevant data determination module 404 retrieves from the user data module 304 the frequency with which the user visits various websites and the amount of time the user spends on the website. The relevant data determination module 404 then selects the relevant data from the associated data based on the frequency with which the user accessed the website corresponding to the associated data. For example, if a user visits a website at least once a day, the relevant data determination module 404 considers the data associated with that website more relevant than associated data collected from another website that the user frequents only once a week.

Additionally, the relevant data determination module 404 selects the relevant data based on the amount of time the user spends on a website. For example, the relevant data determination module 404 considers data associated with a website where the user spends an hour a day more relevant than data associated with a website where the user spends five minutes per week. In one embodiment, the relevant data determination module 404 in determining relevant data gives the user's temporal usage more weight than the user's frequent usage. For example, the relevant data determination module 404 considers data associated with a website where there user spends fifteen minutes daily more relevant than data associated with a website frequented by a user fifteen times a week. In yet another embodiment, the relevant data determination module 404 selects relevant data from the associated data based on indicators from a third party. For example, a search engine ranks its search results for a search term. The relevant data determination module 404 gives more weight to content of higher ranked search result pages than lower ranked search result pages.

After determining the relevant data from the user's data, the relevant data determination module 404 determines if adequate relevant data is available to make feed recommendations. In one embodiment, the relevant data determination module 404 determines the selected relevant data as adequate if the selected data includes a predetermined or dynamically determined number of data points. For example, the relevant data determination module 404 concludes that adequate relevant data has been selected if the selected relevant data includes thirty web addresses and seventy search terms or a combination of hundred items that comprise web addresses and search terms. In another embodiment, the relevant data determination module 404 determines the selected relevant data as adequate if the selected data comprises an adequate amount of data. For example, the relevant data determination module 404 concludes that adequate relevant data has been collected if 250 kilobytes of search terms and web addresses have been collected.

If adequate relevant data has not been selected, the relevant data determination module 404 retrieves or receives from the user data module 304 the user's friends on one or more social networking sites. The relevant data determination module 404 then retrieves user data associated with the user's friends and selects relevant data from the user's friends. In one embodiment, if more than adequate amount of data associated with user's friend is available, the relevant data determination module 404 first selects as relevant data the data associated with users who have fewer degrees of separation to the user. If required, the relevant data determination module 404 then selects as relevant data the data associated with users who have greater degrees of separation to the user. Degrees of separation is the amount of intermediate contacts that connect two users. For example, degrees of separation for user A and user B is zero if the two users are friends. Similarly, degrees of separation between user A and user C is one if user C is a friend of user B but not user A. In this case, user A and user C are connected through an intermediate contact, i.e. user B.

If additional relevant data is still desired, the relevant data determination module 404 retrieves relevant user data associated with other users of browser 108 who share common characteristics with the user. The common characteristics include age group, sex, income level, hobbies, taste in music, topics of interest, etc. If additional relevant data is desired, the relevant data determination module 404 retrieves relevant data associated with remaining users of browser 108.

The associated feed module 406 receives the relevant data from the relevant data determination module 404 and determines feeds associated with the relevant data. For web addresses received in the relevant data, the associated feed module 406 searches for links to feeds in the source code of the web page referenced by the received address. For example, RSS is one type of feed and therefore the associated feed module 406 searches for links with type set to "application/rss+xml." An example of such a link is <LINK rel="alternate" type="application/rss+xml" title="RSS" href="http://www.nytimes.com/services/xml/rss/nyt/HomePage.xml"/>. For search terms received in relevant data, the associated feed module 406 searches for web pages that are relevant to the search term. The associated feed module 406 then searches the source code of the relevant pages for links to feeds. These determined links are links for feeds to be recommended to the user.

Referring to FIG. 3 again, the feed recommendation module 306 repeatedly uses its modules like associated feed module 406 to determine feed recommendations for the user and transmit the feed recommendations to the user. The feed recommendation module 306 waits for a predetermined amount of time before recommending feeds to the user again. In one embodiment, the feed recommendation module 306 stores in user data module 304 the feeds that have been recommended to the user. In the next feed recommendation for the user, the feed recommendation module 306 checks for feeds already recommended to the user and does not transmit the previously recommended feeds to browser 108. In this manner, only new recommendations are made to the user. As feed recommendations are made to the user, the amount of new feed recommendations for the user may gradually decrease over time. On the other hand, an event like the user joining a new social network can trigger an increase in the amount of feed recommendations for the user. Accordingly, the wait adjustment module 308 helps the feed recommendation module 306 adapt to such activity by adjusting its wait period before recommending feeds to the user again.

The wait adjustment module 308 adjusts the wait period based on one more factors like the amount of user data collected, a change in user behavior like the user joining a new social networking site, and a change in the amount of additional user data being transmitted by the browser 108 after the browser has transmitted a predetermined or dynamically determined amount of user data. The wait adjustment module 308 initially maintains the same wait period until the browser 108 has transmitted a per-determined amount of user data. After a determined amount of user data is transmitted, the wait adjustment module 308 determines that the amount of collected user data for the user has reached a threshold and the browser 108 would not transmit additional user data for the user at the same rate. Accordingly, the wait adjustment module 308 increases the wait period. In one embodiment, the wait adjustment module 308 then decreases the wait period if user data module 304 starts receiving additional data for a user more frequently from browser 108. In another embodiment, the wait adjustment module 308 decreases the wait period if the amount of user data transmitted to user data module 304 increases beyond a threshold.

In yet another embodiment, the wait adjustment module 308 adjusts the wait period when the wait adjustment module 308 detects or determines a change in user's activities. For example, a user joining a new social network can lead to a sudden increase in the user's data. If a user joins a new social network, the user connects with additional users in the network, visits those network users' page and prompts the browser 108 to collect more user data about the newly visited pages and the content on those pages. Accordingly, the wait adjustment module 308 decreases the wait period until the collection of user data slows down to a level comparable to the level before the new user activity. Examples of additional user activities that lead to additional user data are visiting new websites, playing new games online, adding additional friends to a user's network etc.

Feed Recommendation Methodology

Figure 5:
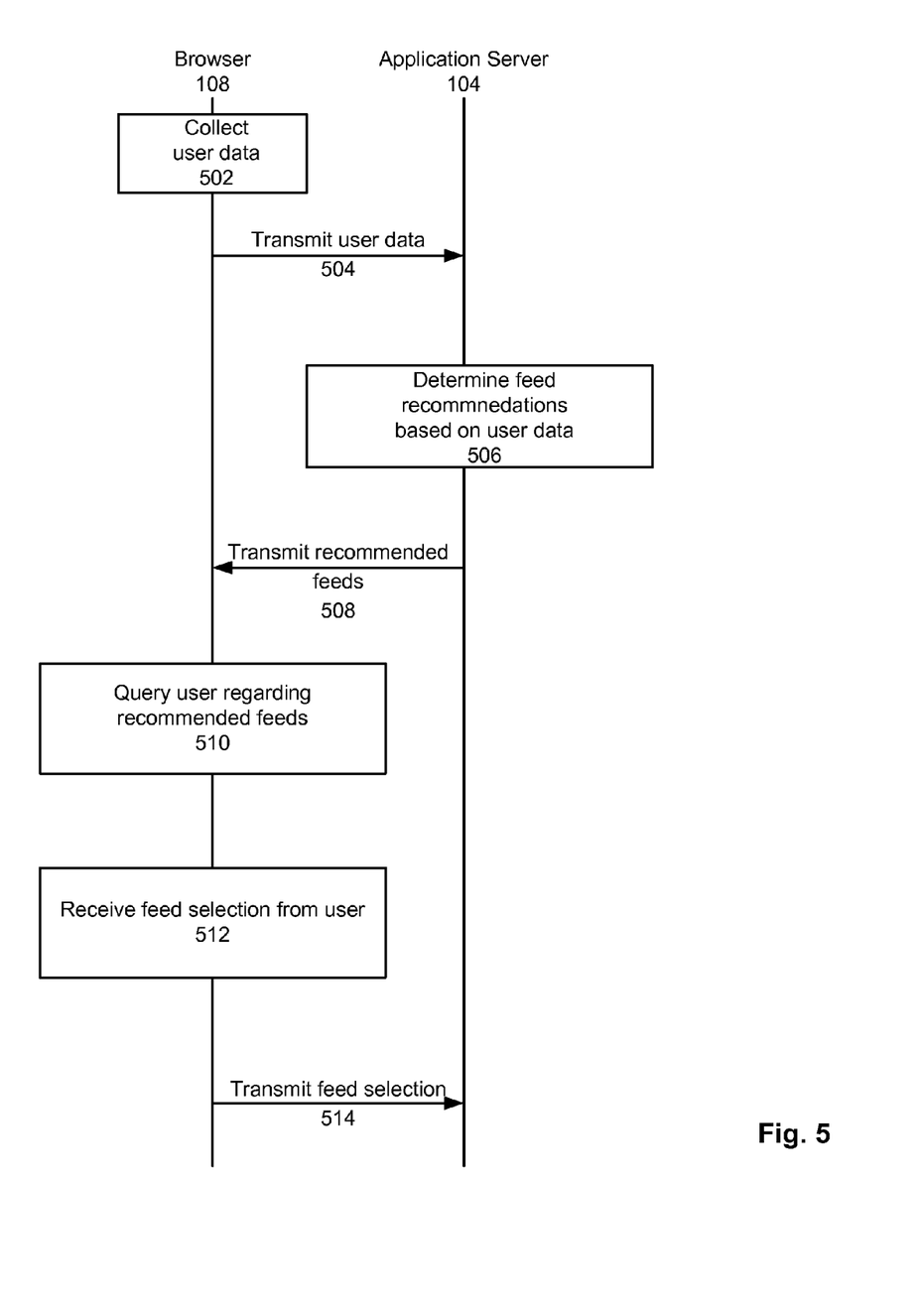
FIG. 5 is a trace diagram illustrating a method for determining specific feeds for a user according to one embodiment.

FIG. 5 is a trace diagram illustrating a method for determining specific feeds for a user according to one embodiment. The browser 108 collects 502 user data related to the user's browsing activity on the browser 108, and then the browser 108 transmits 504 the user data to application server 104. The browser 108 performs steps 502 and 504 repeatedly as the browser 108 collects or determines new user data. Alternatively, the browser 108 may accumulate user data for a period of time, and then transmit 504 the accumulated user data in batches. An embodiment of a method for collecting user data is described below in FIG. 6. The application server 104 receives user data and determines 506 feed recommendations for the user based on received user data. An embodiment of a method for determining feed recommendations is described in FIG. 8 below.

The application server 104 then transmits 508 the determined feed recommendations to browser 108 and the browser 108 provides the recommended feeds to the user. The application server 104 performs steps 506-508 repeatedly as the application server 104 determines additional feed recommendations for the user. In one embodiment, the application server 104 waits for a predetermined amount of time before the application server 104 transmits additional feed recommendations to browser 108. Moreover, the application server 104 may repeatedly adjust the wait period for recommending new feeds based on the user activity and the user data collected by the application server 104. An embodiment of a method for adjusting wait period is described in FIG. 10 below.

After the application server transmits 508 the feed recommendations to browser 108, the browser 108 queries 510 the user on whether the user wants one or more of the recommended feeds. Consequently, the browser 108 receives 512 from the user an input indicating one or more recommended feeds selected by the user. In one embodiment, the user input indicates that the user has not selected any of the recommended feeds. Next, the browser 108 transmits 514 the selected feeds to application server 104, and the application server 104 stores the user's selections.

Figure 6:
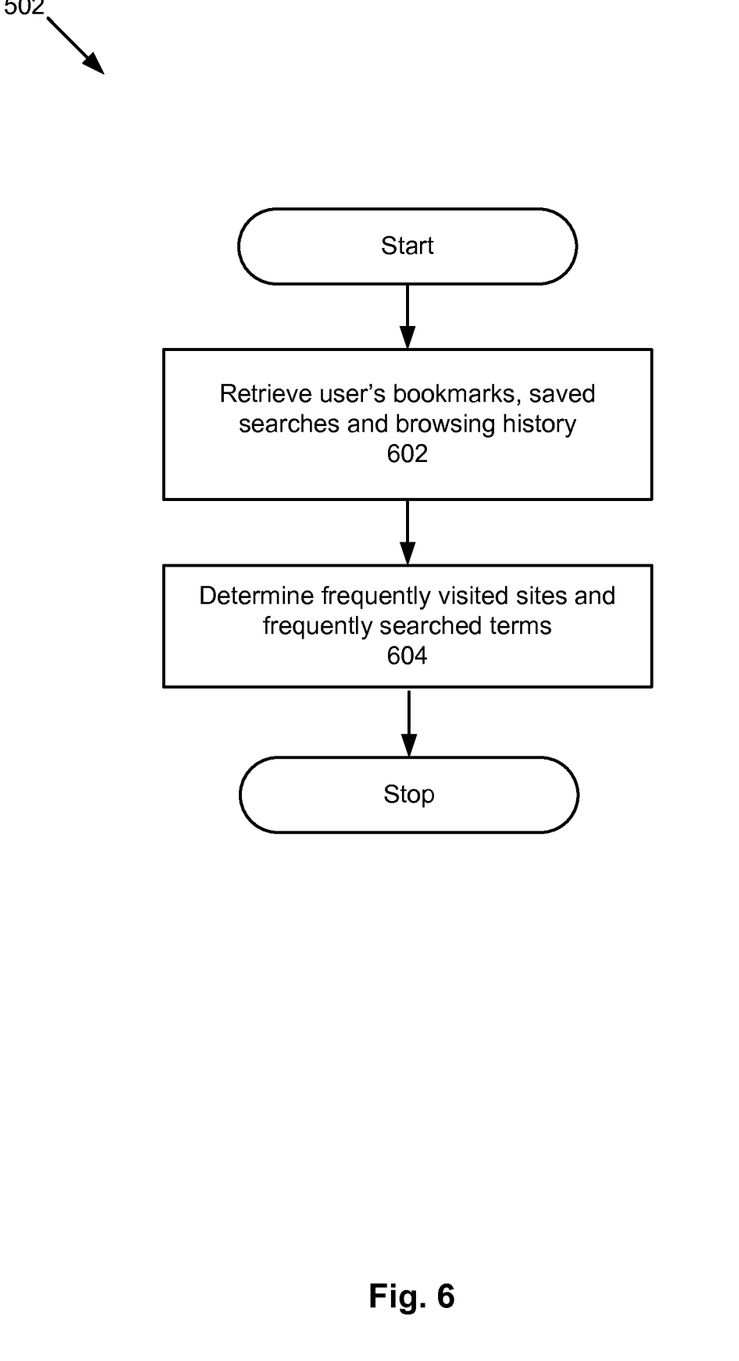
FIG. 6 is a flow diagram illustrating a method for collecting user data according to one embodiment.
Figure 7:
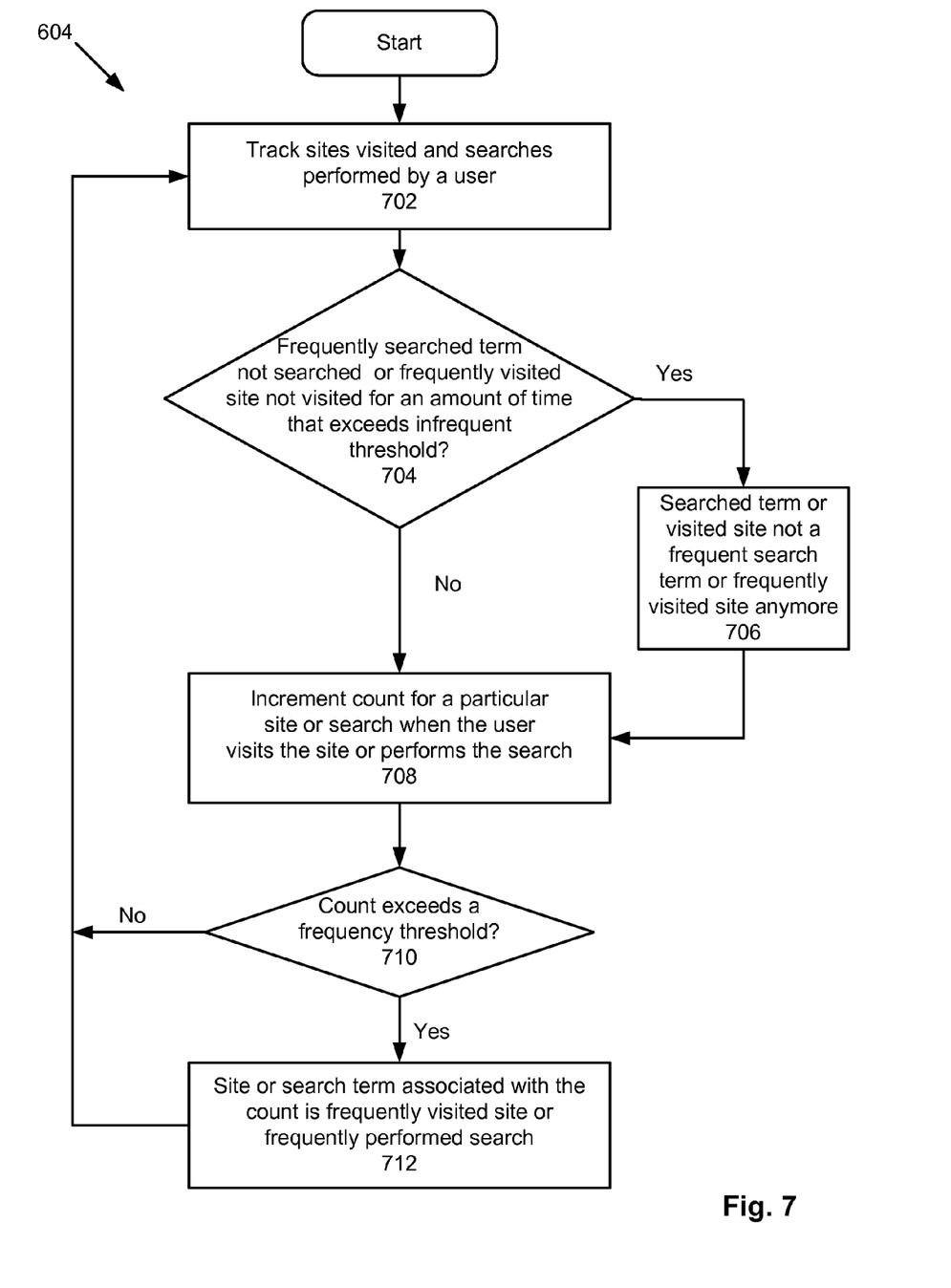
FIG. 7 is a flow diagram illustrating a method for determining frequently visited sites and frequently searched terms according to one embodiment.

FIG. 6 is a flow chart illustrating a method for determining user data according to one embodiment of the disclosure. To determine user data, the browser 108 retrieves 602 user's bookmarks, saved searches and browsing history. Additionally, browser 108 determines 604 the websites that are frequently visited by the user and search terms that are frequently searched by the user. FIG. 7 illustrates a method for determining the frequently visited websites and frequently searched terms. Referring to FIG. 7, the browser 108 saves 702 the websites visited by the user or the searches performed by the user. The browser 108 also saves the date and/or time the user visited the website or performed a particular search. The browser 108 then determines 704 if the user visited the same website or performed the same search previously. If the website was not previously visited or the search was not previously performed within an amount of time, the browser 108 marks the website or the search term as an infrequently visited site or infrequently visited term. Otherwise, the browser 108 increments a count for the search term or the website.

Next, the browser 108 determines 710 if the count associated with the search term or the website has exceeded a frequency threshold. If not, the browser 108 repeats steps 702-710. Otherwise, the browser 108 marks the search term or the website as a frequently visited website. The browser 108 then repeats steps 702-712.

Figure 8:
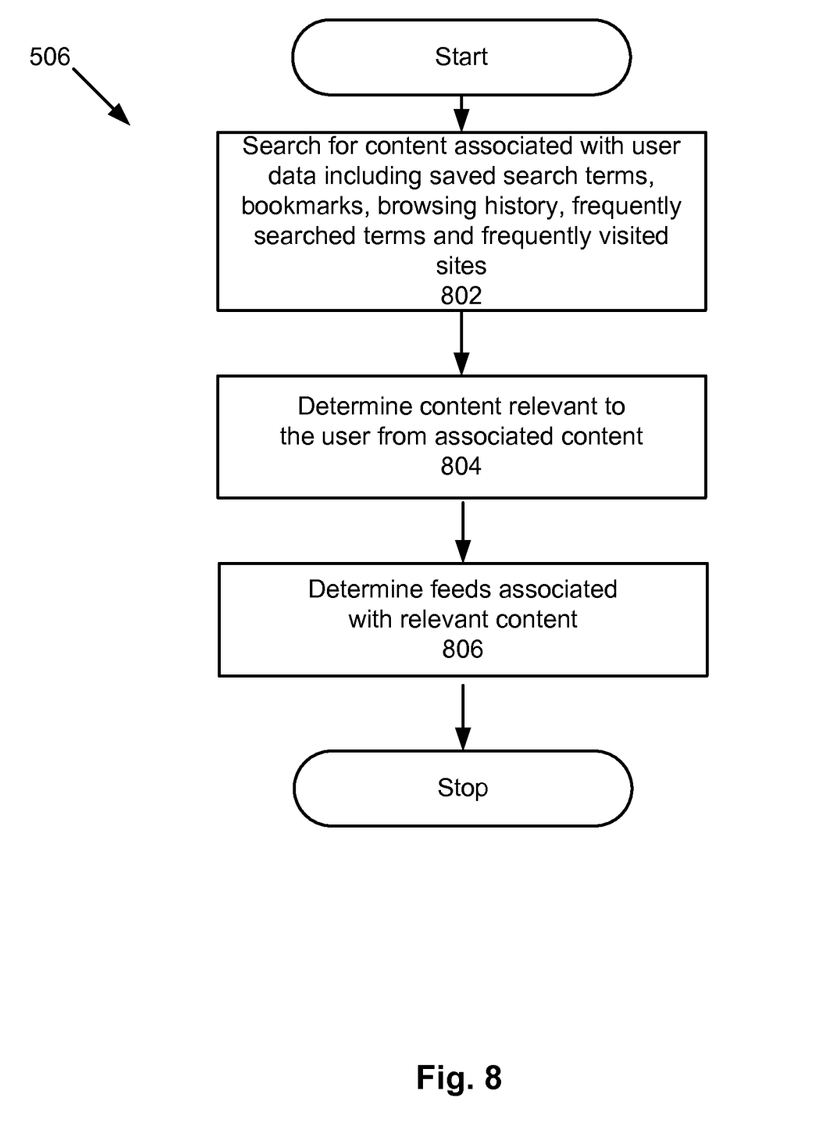
FIG. 8 is a flow diagram illustrating a method for determining feed recommendations for users based on their user data according to one embodiment.

FIG. 8 is a flow chart illustrating a method for determining feed recommendations for users based on their user data according to one embodiment. The application server 104 receives user data and searches 802 for content associated with the received user data. For example, the application server 104 searches the content on user's frequently visited websites and bookmarked websites. Additionally, the application server 104 performs searches based on user's saved search terms and frequently searched terms. After the application server has collected content associated with the user data, the application server 104 determines 804 the relevant content from the collected content. The method for determining relevant content is described below in FIG. 9. The application server 104 then determines 806 the feeds associated with the relevant content.

Figure 9:
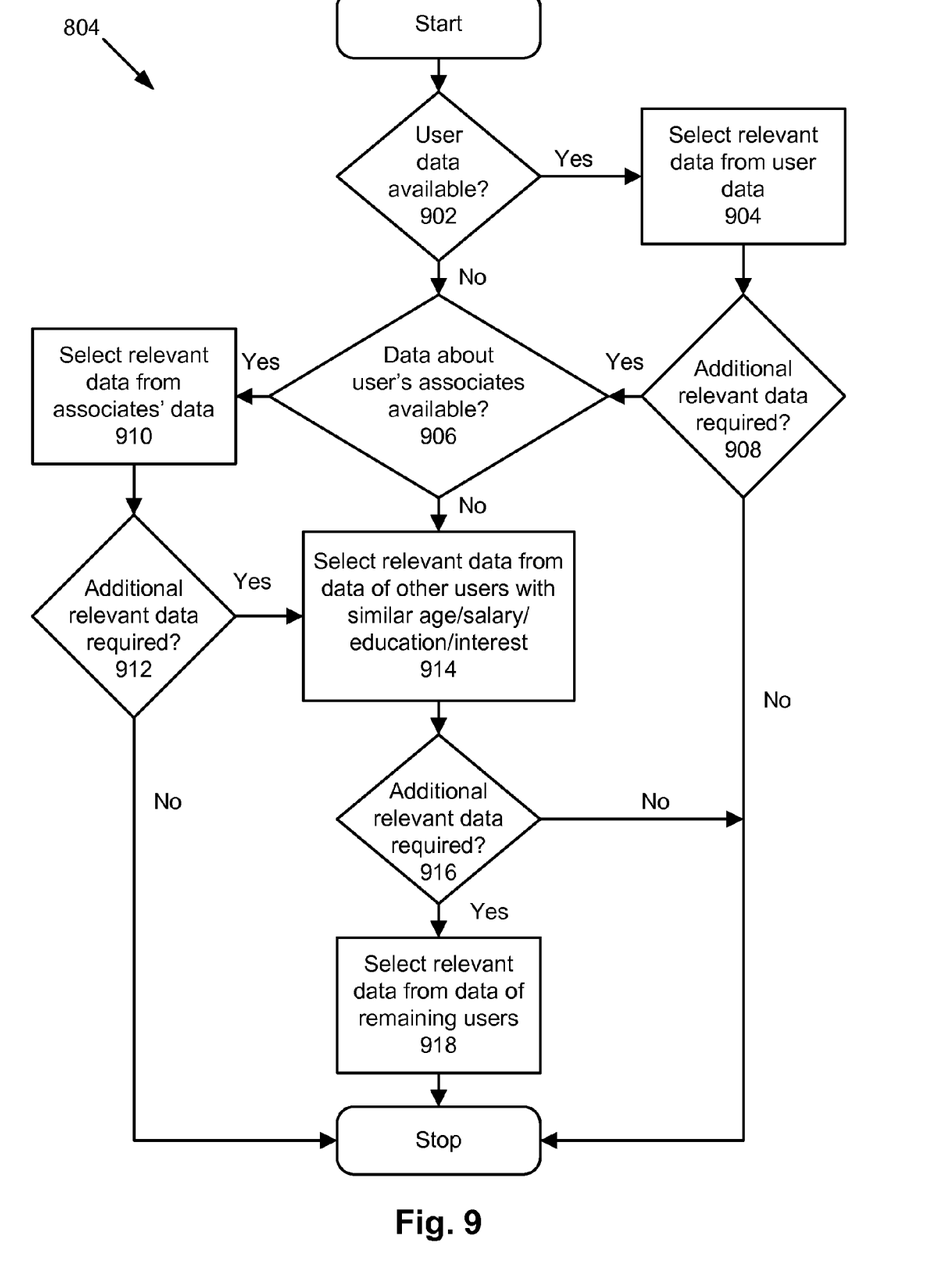
FIG. 9 is a flow diagram illustrating a method for determining relevant content for a user according to one embodiment.

FIG. 9 is a flow diagram illustrating a method for determining relevant content for a user according to one embodiment. To determine relevant content for a first user, the application server 104 determines 902 if user data is available for the first user. If the first user is a new user of browser 108, user data may not be available for the first user. If user data is available, the application server 104 determines 908 if additional relevant data is required to make feed recommendations. If not, the application server 104 has adequate amount of relevant user data and the method for determining relevant user data terminates.

Otherwise, the application server 104 next determines 906 if other users are associated with the first user and whether user data is available for the associated users. If so, the application server 104 selects the user data of the associated users as relevant data. In one embodiment, the application server 104 selects the relevant user data of the associated users as relevant data for the first user. Next, the application server 104 determines 910 if additional relevant data is required to make feed recommendations. If not, the application server 104 has adequate amount of relevant user data and the method for determining relevant user data terminates.

Otherwise, the application server 104 selects 914 relevant data for the first user as the user data or the relevant user data of other users who have similar characteristics as the first user. Next, the application server 104 determines 916 if additional relevant data is required to make feed recommendations. If not, the application server 104 has adequate amount of relevant user data and the method for determining relevant user data terminates. Otherwise, the application server 104 selects 918 relevant data for the first user as the user data or the relevant user data of remaining users of browser 108.

Figure 10:
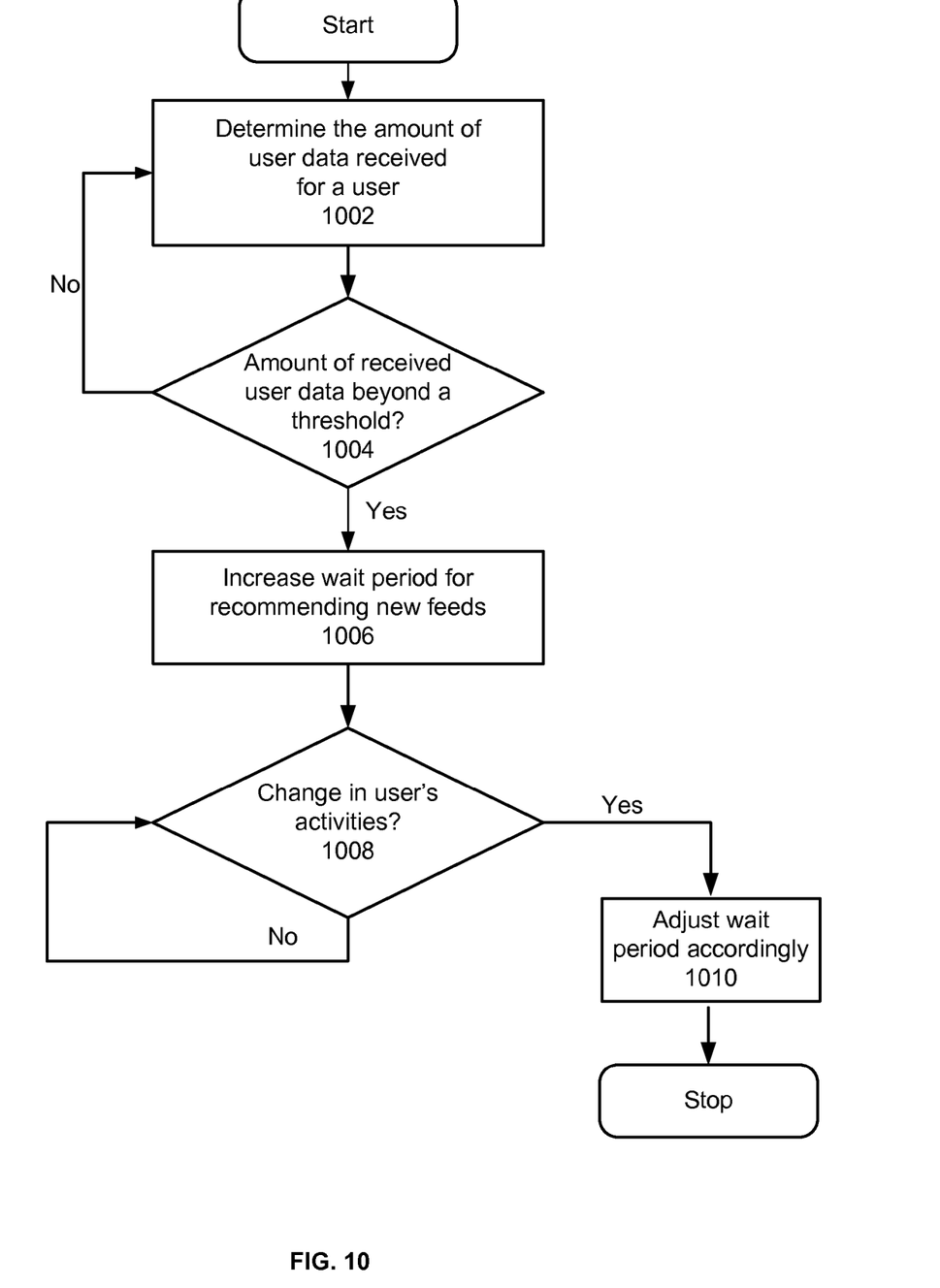
FIG. 10 is a flow diagram illustration a method for adjusting period to wait before recommending new feeds to the user according to one embodiment.

FIG. 10 is a flow diagram illustration a method for adjusting the period to wait before recommending new feeds to the user according to one embodiment of the present invention. To adjust the wait period, the application server 104 determines 1002 the amount of user data received for the user and determines 1004 if the amount of received user data has surpassed a threshold. If not, the application server 104 repeats steps 1002-1004. Otherwise, the application server 104 increases the period for waiting before transmitting new feed recommendations. The application server 104 then repeatedly receives user data and determines 1008 from the received data if the user's behavior or user's activities have changed. If not, the application server keeps 1008 analyzing the received user data to detect changes in user activity. Otherwise, the application server 104 adjusts 1010 the wait period according to the change in user's activity.

As mentioned above, the functionality of the browser 108 and the application server 104 has been described for illustration purposes and the above described functionality can be implemented either in the browser 108 or the application server 104. For example, the application server 104 is illustrated above as including the user data module 304, the feed recommendation module 306 and the wait adjustment module 308. In one embodiment, these modules 304-308 are included in the browser 108. Accordingly, the authentication module 203 authenticates the user, the data modules 204-206 collect information about the user's browsing history or browsing pattern and transmit the collected information to the user data module 304 in browser 108. The feed recommendation module 306 in browser 108 analyzes the user data in user data module 304 and determines the feed recommendations for the user, and the wait adjustment module 306 in browser 108 adjusts the period to wait before recommending additional feeds.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for recommending feeds for a user, the method comprising:
    requesting, by a web browser, authentication information for the user, wherein the authentication information is used to associate the user with activities of the user on a plurality of websites, the request for authentication information made before the user requests access to the plurality of websites using the browser;
    receiving authentication information associated with the user, the authentication information used to associate the user with the web browser;
    authenticating the user based on the received authentication information;
    identifying a plurality of content items published within the plurality of websites and one or more additional websites, each of the one or more additional websites referenced by at least one of the plurality of websites;
    generating a feed for the user that comprises a subset of the plurality of content items, the subset selected based, at least in part, on the user's activities on the plurality of websites and a ranking of the plurality of websites, wherein the subset of the plurality of content items includes a first content item published within a first one of the plurality of websites, and the first content item is selected based, at least in part, on a rank associated with first website and determined by a search engine, wherein the subset of the plurality of content items are selected such that greater weight is given to content items associated with high ranked search result pages than lower ranked search result pages; and
    communicating the generated feed to a module in the web browser for recommendation to the user.

2. The computer-implemented method of claim 1, further comprising:
    determining a change in the user's browsing activities; and
    adjusting a wait period in response to the change in the user's browsing activity, the wait period specifying an amount of time to wait before updating the feed with one or more additional content items.

3. A non-transitory computer program product for recommending feeds for a user, the computer program product comprising a non-transitory computer-readable storage medium containing computer program code for:
    requesting, by a web browser, authentication information for the user, wherein the authentication information is used to associate the user with activities of the user on a plurality of websites, the request for authentication information made before the user requests access to the plurality of websites using the browser;
    receiving authentication information associated with the user, the authentication information used to associate the user with the web browser;
    authenticating the user based on the received authentication information;
    identifying a plurality of content items published within the plurality of websites and one or more additional websites, each of the one or more additional websites referenced by at least one of the plurality of websites;
    generating a feed for the user that comprises a subset of the plurality of content items, the subset selected based, at least in part, on the user's activities on the plurality of websites and a ranking of the plurality of websites, wherein the subset of the plurality of content items includes a first content item published within a first one of the plurality of websites, and the first content item is selected based, at least in part, on a rank associated with first website and determined by a search engine, wherein the subset of the plurality of content items are selected such that greater weight is given to content items associated with high ranked search result pages than lower ranked search result pages; and
    communicating the generated feed to a module in the web browser for recommendation to the user.

4. The computer program product of claim 3, further comprising computer program code for:
    determining a change in the user's browsing activities; and
    adjusting a wait period in response to the change in the user's browsing activity, the wait period specifying an amount of time to wait before updating the feed with one or more additional content items.

5. A computer-implemented method for receiving feed recommendations, the method comprising:
    requesting, by a web browser, authentication information for the user, wherein the authentication information is used to associate the user with activities of the user on a plurality of websites, the request for authentication information made before the user requests access to the plurality of websites using the browser;
    receiving authentication information associated with a user, the authentication information used to associate the user with the web browser;
    authenticating the user based on the received authentication information;
    identifying a plurality of content items published within the plurality of websites and one or more additional websites, each of the one or more additional websites referenced by at least one of the plurality of websites;

generating a feed for the user that comprises a subset of the plurality of content items, the subset selected based, at least in part, on the user's activities on the plurality of websites and a ranking of the plurality of websites, wherein the subset of the plurality of content items includes a first content item published within a first one of the plurality of websites, and wherein the first content item is selected based, at least in part, on a rank associated with first website and determined by a search engine, wherein the subset of the plurality of content items are selected such that greater weight is given to content items associated with high ranked search result pages than lower ranked search result pages; and performing at least one step from a group of steps comprising:
 displaying an option to add the generated feed to a list of feeds associated with the web browser and the user; and
 adding the generated feed to a list of feeds associated with the web browser and the user.

6. The method of claim 1, wherein at least one of the subset of the plurality of content items is published within the one or more additional websites.

7. The method of claim 1, wherein generating the feed comprises:
 for each of the plurality of websites, determine a quantity of time the user performs activities on the website and a frequency with which the user accesses the website;
 ranking the plurality of websites and the one or more additional websites according to the quantity of time the user performs activities on each website and the frequency with which the user accesses each website of the plurality of websites; and
 selecting the subset of the plurality of content items based on the rankings of the plurality of websites and the one or more additional websites.

8. The method of claim 7, wherein ranking comprises, for each of the plurality of websites, weighting the quantity of time the user performs activities on the website based on a first weight and weighting the frequency with which the user accesses the website based on a second weight.

9. The method of claim 1, further comprising:
 identifying one or more additional users connected to the user via a social networking platform; and
 identifying a second plurality of content items published within a second plurality of websites accessed by the one or more additional users, wherein the generated feed includes the second plurality of content items.

10. The computer program product of claim 3, wherein at least one of the subset of the plurality of content items is published within the one or more additional websites.

11. The computer program product of claim 3, wherein generating the feed comprises:
 for each of the plurality of websites, determine a quantity of time the user performs activities on the website and a frequency with which the user accesses the website;
 ranking the plurality of websites and the one or more additional websites according to the quantity of time the user performs activities on each website and the frequency with which the user accesses each website of the plurality of websites; and
 selecting the subset of the plurality of content items based on the rankings of the plurality of websites and the one or more additional websites.

12. The computer program product of claim 11, wherein ranking comprises, for each of the plurality of websites, weighting the quantity of time the user performs activities on the website based on a first weight and weighting the frequency with which the user accesses the website based on a second weight.

13. The computer program product of claim 3, further comprising computer program code for:
 identifying one or more additional users connected to the user via a social networking platform; and
 identifying a second plurality of content items published within a second plurality of websites accessed by the one or more additional users, wherein the generated feed includes the second plurality of content items.

14. The method of claim 5, wherein at least one of the subset of the plurality of content items is published within the one or more additional websites.

15. The method of claim 5, wherein generating the feed comprises:
 for each of the plurality of websites, determine a quantity of time the user performs activities on the website and a frequency with which the user accesses the website;
 ranking the plurality of websites and the one or more additional websites according to the quantity of time the user performs activities on each website and the frequency with which the user accesses each website of the plurality of websites; and
 selecting the subset of the plurality of content items based on the rankings of the plurality of websites and the one or more additional websites.

16. The method of claim 15, wherein ranking comprises, for each of the plurality of websites, weighting the quantity of time the user performs activities on the website based on a first weight and weighting the frequency with which the user accesses the website based on a second weight.

17. The method of claim 5, further comprising:
 identifying one or more additional users connected to the user via a social networking platform; and
 identifying a second plurality of content items published within a second plurality of websites accessed by the one or more additional users, wherein the generated feed includes the second plurality of content items.

18. The method of claim 5, wherein the first website is associated with a result of a search term provided by the user executed on the search engine.

19. The method of claim 1, wherein the first website is associated with a result of a search term provided by the user executed on the search engine.

20. The non-transitory computer program product of claim 3, wherein the first website is associated with a result of a search term provided by the user executed on the search engine.

* * * * *